(12) United States Patent
Martel et al.

(10) Patent No.: US 10,754,931 B2
(45) Date of Patent: Aug. 25, 2020

(54) METHODS FOR CONFIGURING SECURITY RESTRICTIONS OF A DATA PROCESSING SYSTEM

(71) Applicant: Apple Inc., Cupertino, CA (US)

(72) Inventors: Pierre-Olivier J. Martel, Mountain View, CA (US); Austin G. Jennings, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 236 days.

(21) Appl. No.: 15/001,085

(22) Filed: Jan. 19, 2016

(65) Prior Publication Data

US 2016/0357950 A1    Dec. 8, 2016

Related U.S. Application Data

(60) Provisional application No. 62/171,835, filed on Jun. 5, 2015.

(51) Int. Cl.
*G06F 21/12* (2013.01)
*G06F 21/57* (2013.01)
*G06F 21/62* (2013.01)

(52) U.S. Cl.
CPC .......... *G06F 21/126* (2013.01); *G06F 21/575* (2013.01); *G06F 21/6281* (2013.01); *G06F 2221/2105* (2013.01)

(58) Field of Classification Search
CPC .. G06F 21/126; G06F 21/575; G06F 21/6281; G06F 21/125; G06F 2221/2105; G06F 9/4415; G06F 11/417; G06F 11/1453

USPC ............................................................ 726/1
See application file for complete search history.

(56) References Cited

U.S. PATENT DOCUMENTS

| 7,552,467 | B2 | 6/2009 | Lindsay |
| 7,865,726 | B2 | 1/2011 | Corley et al. |
| 8,146,138 | B2 | 3/2012 | Chen et al. |
| 8,321,863 | B2 | 11/2012 | Yamaguchi et al. |
| 2002/0095593 | A1* | 7/2002 | Daniell ................. G06F 21/604 726/26 |
| 2002/0116542 | A1 | 8/2002 | Tarbotton et al. |
| 2002/0157001 | A1* | 10/2002 | Huang .................... G06F 9/441 713/2 |
| 2005/0289353 | A1 | 12/2005 | Dahlke |
| 2006/0212407 | A1 | 9/2006 | Lyon |
| 2007/0143624 | A1 | 6/2007 | Steeves |

(Continued)

*Primary Examiner* — Alexander Lagor
*Assistant Examiner* — William B Jones
(74) *Attorney, Agent, or Firm* — Womble Bond Dickinson (US) LLP

(57) ABSTRACT

According to one embodiment, a security manager of a first operating system executed by a processor of a data processing system receives a request received from an application to modify a security settings of the data processing system. In response to the request, the data processing system is restarted into a second operating system, where the second operating system includes functionalities that are fewer than the first operating system. The security settings of the data processing system is modified within the second operating system. After the security settings of the data processing system has been modified, the data processing is rebooted back to the first operating system. A security measure within the first operating system is enforced based on the modified security settings.

21 Claims, 6 Drawing Sheets

(56) References Cited

U.S. PATENT DOCUMENTS

| | | | |
|---|---|---|---|
| 2008/0120499 A1 | 5/2008 | Zimmer et al. | |
| 2008/0155542 A1* | 6/2008 | Maigne | G06F 9/4555 718/100 |
| 2008/0252493 A1 | 10/2008 | Cho et al. | |
| 2011/0023110 A1 | 1/2011 | Freund et al. | |
| 2011/0292031 A1 | 12/2011 | Zhu et al. | |
| 2012/0185933 A1 | 7/2012 | Belk et al. | |
| 2012/0297177 A1 | 11/2012 | Ghosh et al. | |
| 2013/0232327 A1 | 9/2013 | Princen et al. | |
| 2015/0058619 A1 | 2/2015 | Sweet et al. | |
| 2015/0347741 A1 | 12/2015 | Krstic et al. | |
| 2018/0241744 A1* | 8/2018 | Wimbock | H04L 63/102 |

\* cited by examiner

METHODS FOR CONFIGURING SECURITY RESTRICTIONS OF A DATA PROCESSING SYSTEM

RELATED APPLICATIONS

This application claims the benefit of U.S. Provisional Patent Application No. 62/171,835, filed Jun. 5, 2015, which is incorporated by reference herein in its entirety.

FIELD OF THE INVENTION

Embodiments of the present invention relate generally to data processing systems. More particularly, embodiments of the invention relate to securely handling modification of security settings of a data processing system.

BACKGROUND

Security concerns for all types of processor-based electronic devices, and particularly for computing devices, have become a significant concern. While some concerns may relate to detrimental actions which may be undertaken by defective code implemented by such devices, the greater concerns relate to the ramifications of various types of attacks made upon such devices through malicious code, including code conventionally known in the field by a number of names, including "viruses," "worms," "Trojan horses," "spyware," "adware," and others. Such malicious code can have effects ranging from relatively benign, such as displaying messages on a screen, or taking control of limited functions of a device; to highly destructive, such as taking complete control of a device, running processes, transmitting and/or deleting files, etc. Virtually any type of imaginable action on a processor-based device has been the subject of attacks by malicious code.

Many of these attacks are directed at computing devices, such as workstations, servers, desktop computers, notebook and handheld computers, and other similar devices. Many of these computing devices can run one or more application programs which a user may operate to perform a set of desired functions. However, such attacks are not limited to such computing devices. A broader group of various types of devices, such as cell phones; personal digital assistants ("PDA's"); music and video players; network routers, switches or bridges; and other devices utilizing a microprocessor, microcontroller, or a digital signal processor, to execute coded instructions have been the subjects of attacks by malicious code.

A number of methodologies have been used in an attempt to reduce or eliminate both the attacks and influence of malicious or defective code. Generally, these methodologies include detection, prevention, and mitigation. Specifically, these methodologies range from attempts to scan, identify, isolate, and possibly delete malicious code before it is introduced to the system or before it does harm (such as is the objective of anti-virus software, and the like), to restricting or containing the actions which may be taken by processes affected by malicious or defective code. However, most of these techniques are ineffective if the malware gains access or operating privilege (e.g., root privilege or administrative privilege).

For example, in a conventional operating system, once the malware gains certain accessing privilege, such as root or administrative privilege, it can cause significant damage to the system. One of the most significant damage will be modify certain security settings of certain system components or applications running within an operating system, which in turn destroys all or most of the security measures of the system. There has been a lack of efficient security prevention mechanisms to prevent such malware even if it gained the necessary accessing privileges.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1A:
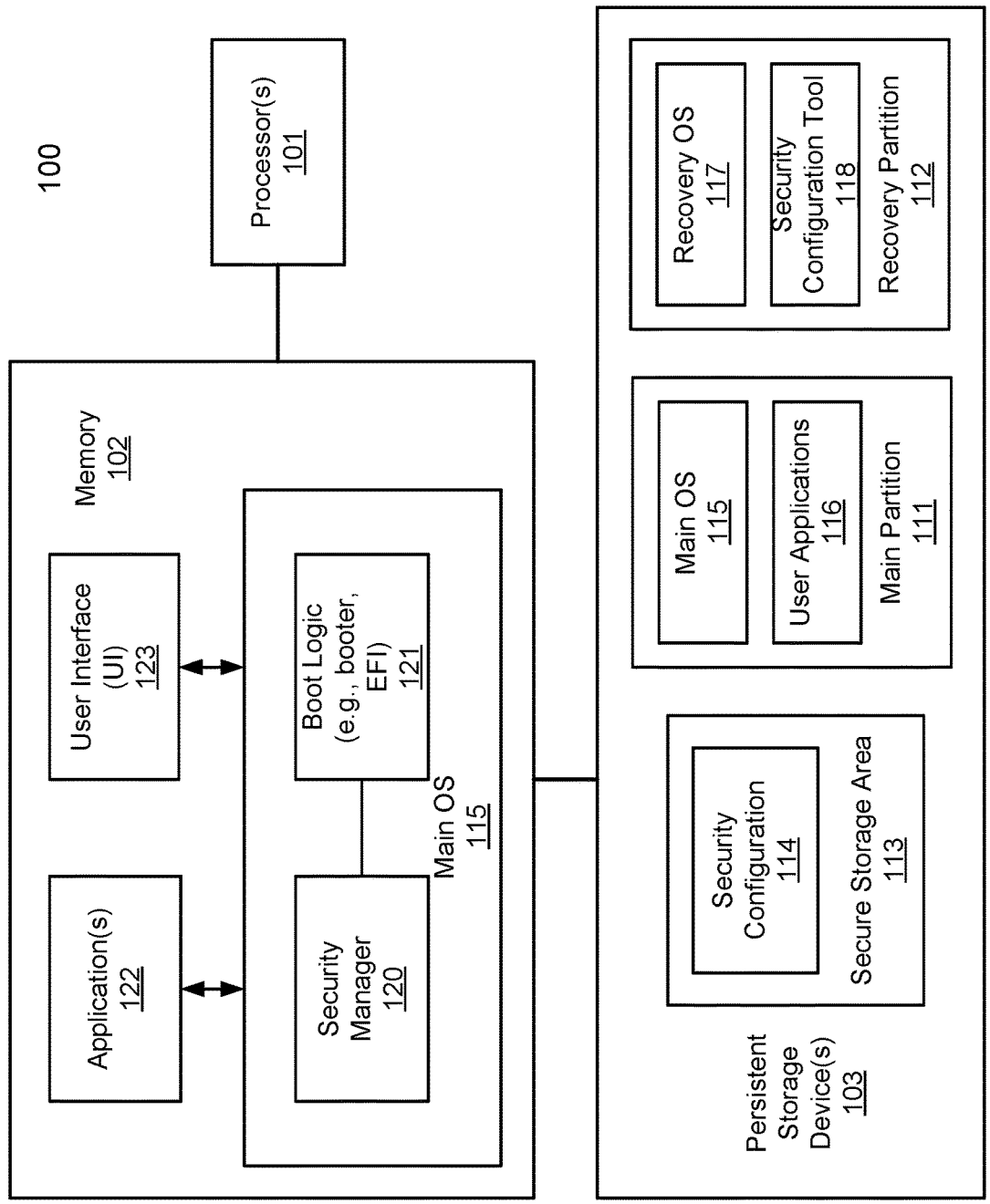
FIGS. 1A-1B are block diagrams illustrating a data processing system according to certain embodiments of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments of the invention, a data processing system includes a first partition to store a main or regular operating system (OS) and a second partition to store a recovery or an auxiliary OS. An application of one partition is not allowed to access resources of another partition without special accessing privileges that is authorized by a trusted source, such as a manufacturer or distributor of the operating system or data processing system. In one embodiment, no application running in the main OS is allowed to modify a security settings of the main OS, which is stored in a main partition (e.g., first partition). Instead, a security configuration tool or application that is specifically configured to modify the security settings is hosted by a recovery OS and stored in a recovery partition (e.g., a second partition).

In order to modify a security settings of the main OS, in one embodiment, a user has to restart or reboot from the main OS into a recovery OS from the recovery partition. In order to reboot the system from the main OS into the recovery OS, the user has to perform a physical action, such as, for example, pressing one or more keys (e.g., command key and/or an "r" key from a keyboard) of the system. Thus, the security settings cannot be tampered by a malicious program; rather, a user has to be physically present. Once the recovery OS has been launched, the user has to invoke the security configuration tool to modify the security settings. Once the security settings has been modified, in order to enforce a security measure based on the modified security settings, the user has to restart again from the recovery OS back to the main OS.

FIG. 1 is a block diagram illustrating a data processing system according to one embodiment of the invention. Referring to FIG. 1, system 100 represents any kind of data processing systems, such as, for example, a server, a desktop (e.g., iMac™ available from Apple Inc.® of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a Smartwatch (e.g., Apple Watch™), a personal communicator, a gaming device, a network router or hub, a wireless access point (AP) or repeater, a set-top box (e.g., Apple TV™ box), or a combination thereof.

System 100 includes main OS 115 loaded into memory 102 from persistent storage device 103 and executed by processing resources, in this example, one or more processors 101. Processing resources may present one or more processors or processor cores. A physical processor typically refers to an integrated circuit, which potentially includes any number of other processing elements, such as cores or hardware threads. A core often refers to logic located on an integrated circuit capable of maintaining an independent architectural state, where each independently maintained architectural state is associated with at least some dedicated execution resources. A processor may be a general-purpose processor such as a central processing unit (CPU).

An operating system, such as main OS 115, is a collection of software that manages computer hardware resources and provides common services for computer programs. The operating system is an essential component of the system software in a computer system. Application programs usually require an operating system to function. Amongst many functionalities of an operating system, scheduling is the method by which threads, processes or data flows are given access to system resources (e.g. processor time, communications bandwidth). This is usually done to load balance and share system resources effectively or achieve a target quality of service. In addition, an operating system may further include other core components, such as a scheduler, a device manager, a kernel, etc. In order not to unnecessarily obscure embodiments of the present invention, these components are not shown herein. An operating system may be any kind of operating systems, such as, for example, iOS™ or OS X™ from Apple®, Android™ from Google®, Windows™ from Microsoft®, or other operating systems (e.g., UNIX, LINUX, real-time or embedded operating systems).

In addition to main OS 115, one or more applications 122 and user interface 123 may also be loaded in memory 102 and hosted by main OS 115. Applications 122 can be a variety of applications such as user applications that are installed by a user operating system 100, such as user applications 116 stored in persistent storage device 103. According to one embodiment, at least some of applications or processes, such as applications 112, may be executed within a respective dedicated or isolated operating environment, such as a sandboxed environment as a separate process address space. A process address space refers to a virtual address space or address space that is the set of ranges of virtual addresses that an operating system makes available to a process. The range of virtual addresses usually starts at a low address and can extend to the highest address allowed by the computer's instruction set architecture. This provides several benefits, one of which is, if each process is given a separate address space, security through process isolation.

In one embodiment, persistent device 103 may be any kind of non-volatile storage device such as hard disks, flash devices, etc. Persistent device 103 may be partitioned into multiple partitions, including main partition 111 (also referred to as a first or primary partition) and recovery partition 112 (also referred to as a second or secondary/auxiliary partition). Main partition 111 is used to store main OS 115 and other user applications 116, as well as user data that are accessed during regular or ordinary operations of data processing system 100. Recovery partition 112 may be a separate and small partition that stores only the necessary software, such as recovery OS 117, to recover at least some of the components in main partition 111, such as, for example, for restore main OS 115 of data processing system 100 back to the original state configured by the manufacturer or distributor. Recovery partition 112 may be a read-only partition, which cannot be compromised by malicious software.

In addition, according to one embodiment, recovery partition 112 includes stored therein security configuration tool 118. Security configuration tool 118 may be used to configure one or more security settings 114, which may be stored in secure storage area 113. Security settings 114 may be any kind of security settings, such as turning on or off of a particular security measure. In one embodiment, security settings 114 may be exclusively accessed by security configuration tool 118, which may only be hosted by recovery OS 117, for example, when data processing system 100 is running in a recovery mode. Another word, security settings 114 may not be modified by any component, especially user applications that are running at a user level, hosted by main OS 115. Note that secure storage area 113 may be maintained in a non-volatile storage device that is separated from the one storing main partition 111 and/or recovery partition 112. Alternatively, the secure storage area 113 may be maintained in the main partition 111 and/or the recovery partition. Similarly, main partition 111 and recovery partition 112 may be stored in the same or separate storage devices.

According to one embodiment, when an application 122 attempts to modify security settings or configuration 114, it sends a request for modifying security settings to security manager 120. In this example, application 122 may or may not be malware. Application 122 may any of applications currently installed in main OS 115. Alternatively, application 122 may be a malware or an application that has been infected or hijacked by malware. Security configuration 114 may be the security configuration of application 122 itself, a security settings of another application, and/or a security settings of a system component, such as an operating system component or hardware component of the data processing system.

In one embodiment, security settings 114 is protected and stored in secure storage location or area 113 of persistent storage device 103 or a remote server via a secure connection of the data processing system 100. For example, security settings 114 may be protected using a variety of encryption techniques and stored in a hidden storage area of a storage device that only security configuration tool 118 or the kernel of main OS 115 would know. A request for modifying a security settings of application 122 (e.g., browser) may be to give a permission to allow another application to access data associated with application 122 (e.g., browser history). In another example, application 122 may be an email or contact application and a request for modifying the security settings is to permitting another application (e.g., social media application) to access the contacts or email history of application 122. If malware gains a certain accessing privilege level such as a root or administrative privilege level, it can gain control of application 122 or impersonate application 122 to modify the security settings 114 to access the privileged data of application 122. Similarly, malware can also modify the security settings of the operating system to take over the control of the operating system.

According to one embodiment, in response to the request for modifying security settings 114, security manager 120 may present a message via user interface 123 informing a user operating data processing system 100 that in order to modify the requested security settings, the system has to be restarted. Security manager 120 further instructs the user to reboot the system into a recovery mode and to perform a physical act that only a human can perform. Once the user confirms to reboot the system, boot logic 121 causes the system to reboot. In one embodiment, during the early stage of the reboot, the user has to perform a predetermined physical action in order to boot the system into a recovery mode, such as, for example, simultaneously pressing multiple keys (e.g., a command key and an "r" key from a keyboard).

Figure 1B:
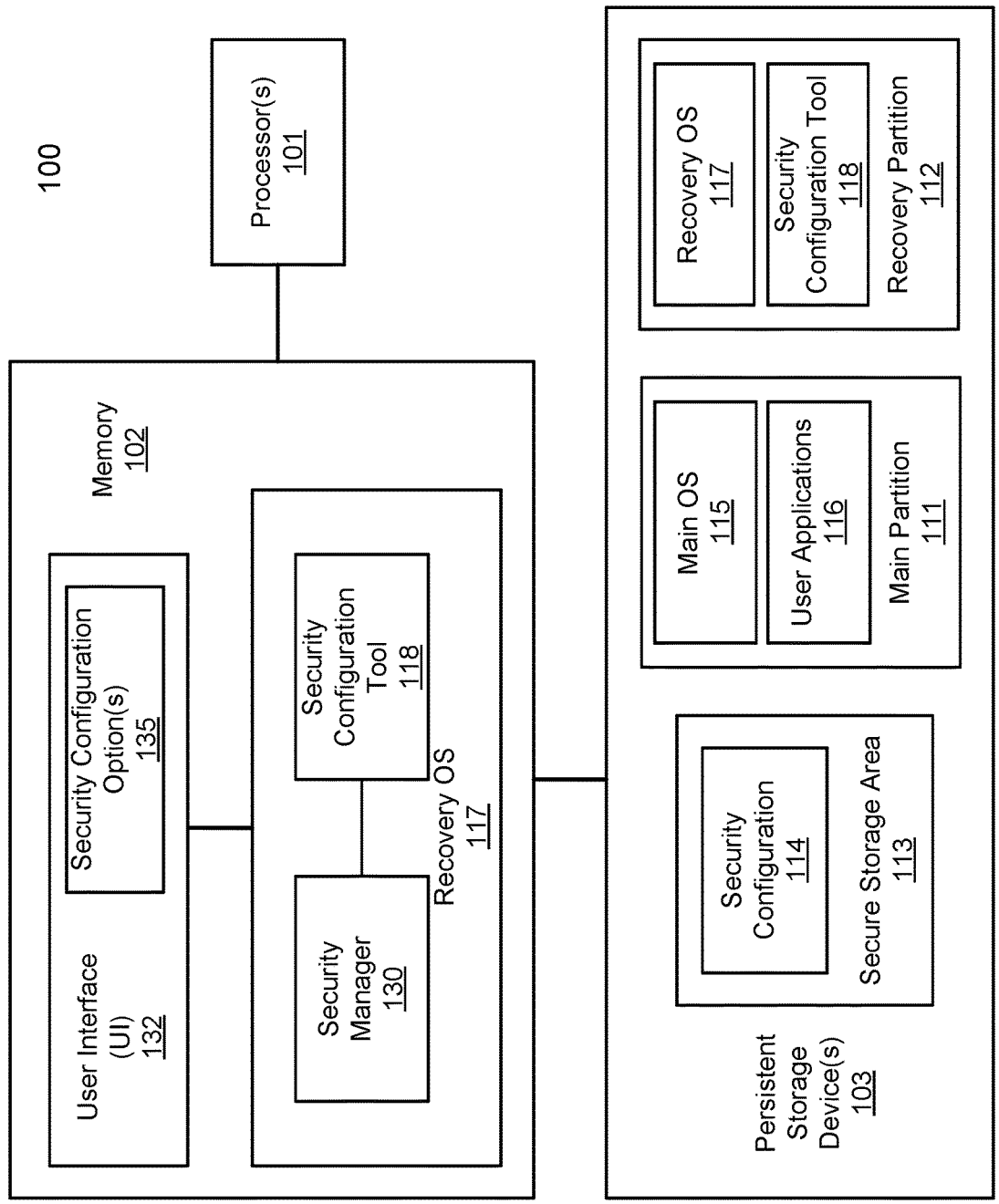

If the user performs the required physical act, the system will boot into a recovery mode by loading recovery OS 117 from recovery partition 112 as shown in FIG. 1B. Referring to FIG. 1B, in this example, it is assumed the system has rebooted into a recovery mode, where recovery OS 117 is loaded into memory 102 hosting security manager 130 and security configuration tool 118. Security manager 130 of recovery OS 117 may have the same or similar functionality as security manager 120 of main OS 115. From the recovery mode, the user can utilize security configuration tool 118 to modify security settings 114 stored in secure storage area 113.

In one embodiment, security configuration tool 118 may present a list of security configuration options 135 via user interface 132 to allow the user to select one or more of them for modification. Once security configuration 114 has been modified, the system may remind the user to reboot the system back to the regular mode as shown in FIG. 7A, in order for the modified security settings takes effect.

In one embodiment, a first partition, in this example, main partition 111 includes main OS 115, user applications 116, as well as other daemons and user data for one or more authorized user accounts. User applications 116 can include a web browser, PDF viewer, photo viewer, photo editor, email applications, text editing applications, number editing applications (e.g. spreadsheets), presentation preparation applications (e.g. Keynote), etc. Main OS 115 may be a full version of the operating system deployed on the data processing system while recovery OS 117 may be a limited or reduced size operating system which does not include all of the installation packages normally associated with a full operating system.

For example, the recovery operating system may not include printer drivers and other accessory software but can include the capability of downloading printer drivers, etc. and other accessory software when in a recovery or repair mode. A daemon can be computer software which is configured to operate in one or more of the methods described herein to protect or recover the system by allowing communication with an external system such as a remote server or another data processing system.

In one embodiment, a second partition, in this example, recovery partition 112, can include recovery software (e.g., recovery OS 117) which is configured to perform at least one of repairing the first partition (e.g., main partition 111) of the data storage device (e.g., storage device 103) or reinstalling the first operating system (e.g., main OS 115) on the first partition, or restoring data files of an authorized user on the first partition, through backups of the data files previously obtained for the authorized user. Further detailed information concerning recovery OS 117 can be found in U.S. patent application Ser. No. 13/090,867, entitled "User Account for System Protection or Recovery," filed Apr. 20, 2011, which is incorporated by reference herein in its entirety.

Figure 2:
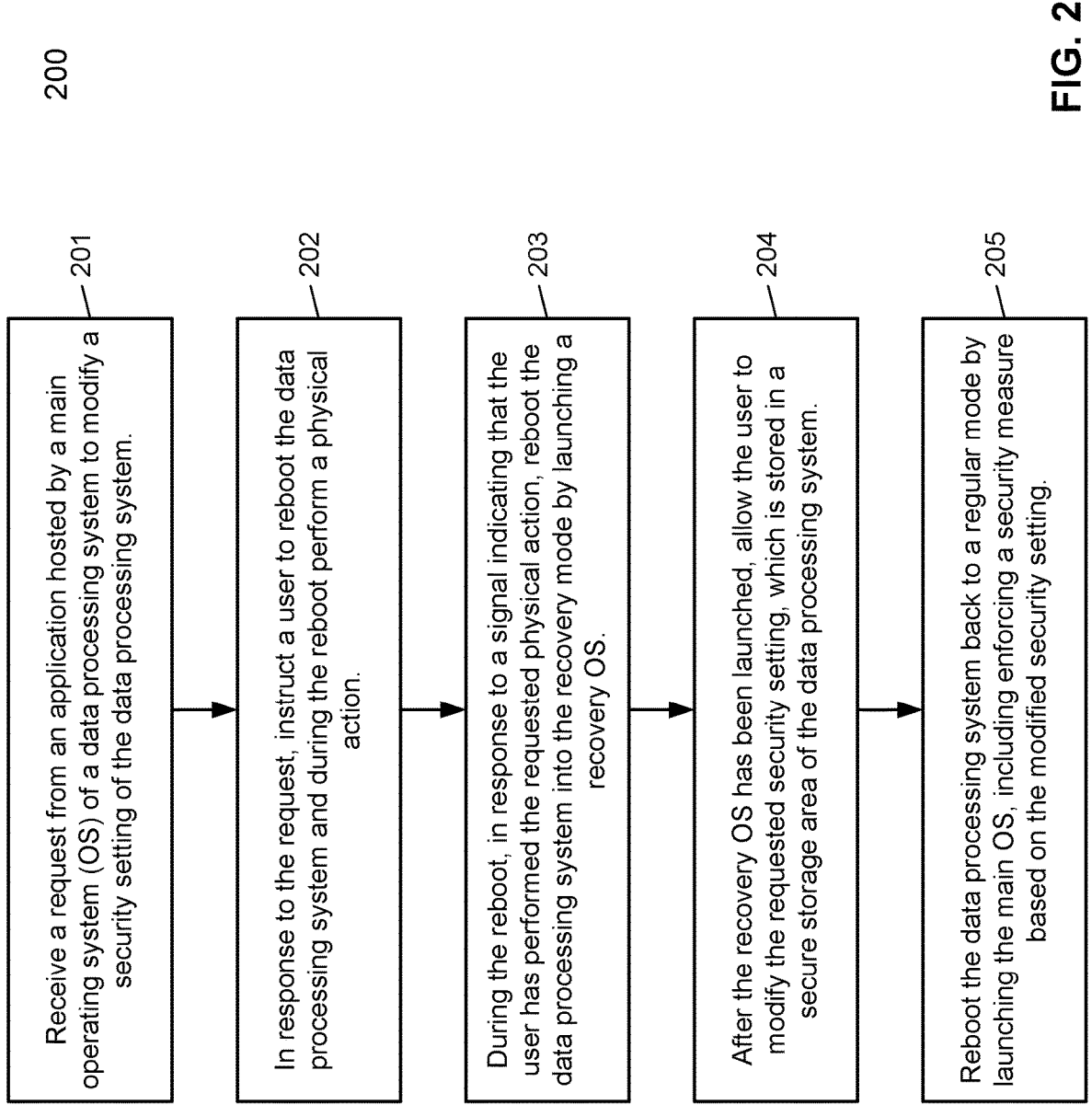
FIG. 2 is a flow diagram illustrating a process of security configuration according to one embodiment of the invention.

FIG. 2 is a flow diagram illustrating a process of security configuration according to one embodiment of the invention. Process 200 may be performed by processing logic that includes hardware (e.g. circuitry, dedicated logic, etc.), software (e.g., embodied on a non-transitory computer readable medium), or a combination thereof. For example, process 200 may be performed by main OS 115 and recovery OS 117 of FIGS. 1A-1B. Referring to FIG. 2, at block 201, processing logic receives a request from an application hosted by a main OS of a data processing system to modify a security settings of the data processing system. In response to the request, at block 202, processing logic instructs a user operating the data processing system to reboot the system and during the reboot perform a predetermined physical action. During the reboot, in response to a signal indicating that the user has performed the requested physical action, at block 203, processing logic reboots the data processing system into a recovery mode by launching a recovery OS from a recovery partition. At block 204, after the recovery OS has been launched, processing logic allows the user to modify the requested security settings using a security configuration tool hosted by the recovery OS. At block 205, the system is rebooted again from the recovery mode back to the regular mode hosted by the main OS, such that a security measure can be enforced based on the modified security settings. According to some embodiments, a user may be requested to perform a physical action in several ways, such as those described in a co-pending U.S. patent application Ser. No. 14/292,711, entitled "Method for Managing Security of a Data Processing System with Configurable Security Restrictions," filed May 30, 2014, which is incorporated by reference herein in its entirety.

As described above, the system may operate in a regular mode or a recovery mode by launching separate operating systems: a main OS from a main partition for regular mode and a recovery OS from a recovery partition for recovery mode. According to another embodiment, a single OS can be configured operate in either a regular mode or a recovery mode. A user has to physically instruct the system to boot the OS into either a regular mode or a recovery mode during an early stage of the startup. When the system operates in a regular mode, most of the programs, including the programs installed by the user (also referred to as third-party programs) and the programs that come with the OS (also referred to as first-party programs), are available. However, when the system operates in a recovery mode, only the first-party programs are available to prevent untrusted malware from tampering the system.

In one embodiment, in order to modify a particular security settings of a particular type, a user has to reboot the system into a recovery mode. While in the recovery mode, the user can then modify the security settings. After the modification of the security settings, the user has to reboot the system back to the regular mode in order for the modified security settings take effect, as described above. In this embodiment, the security manager is the same component operating either in the regular mode or the recovery mode. When a request is received to modify a security settings, the security manager determines whether the OS is currently operating in a recovery mode. If so, the security manager allows the security settings to be modified; otherwise, the request is denied.

Figure 3:
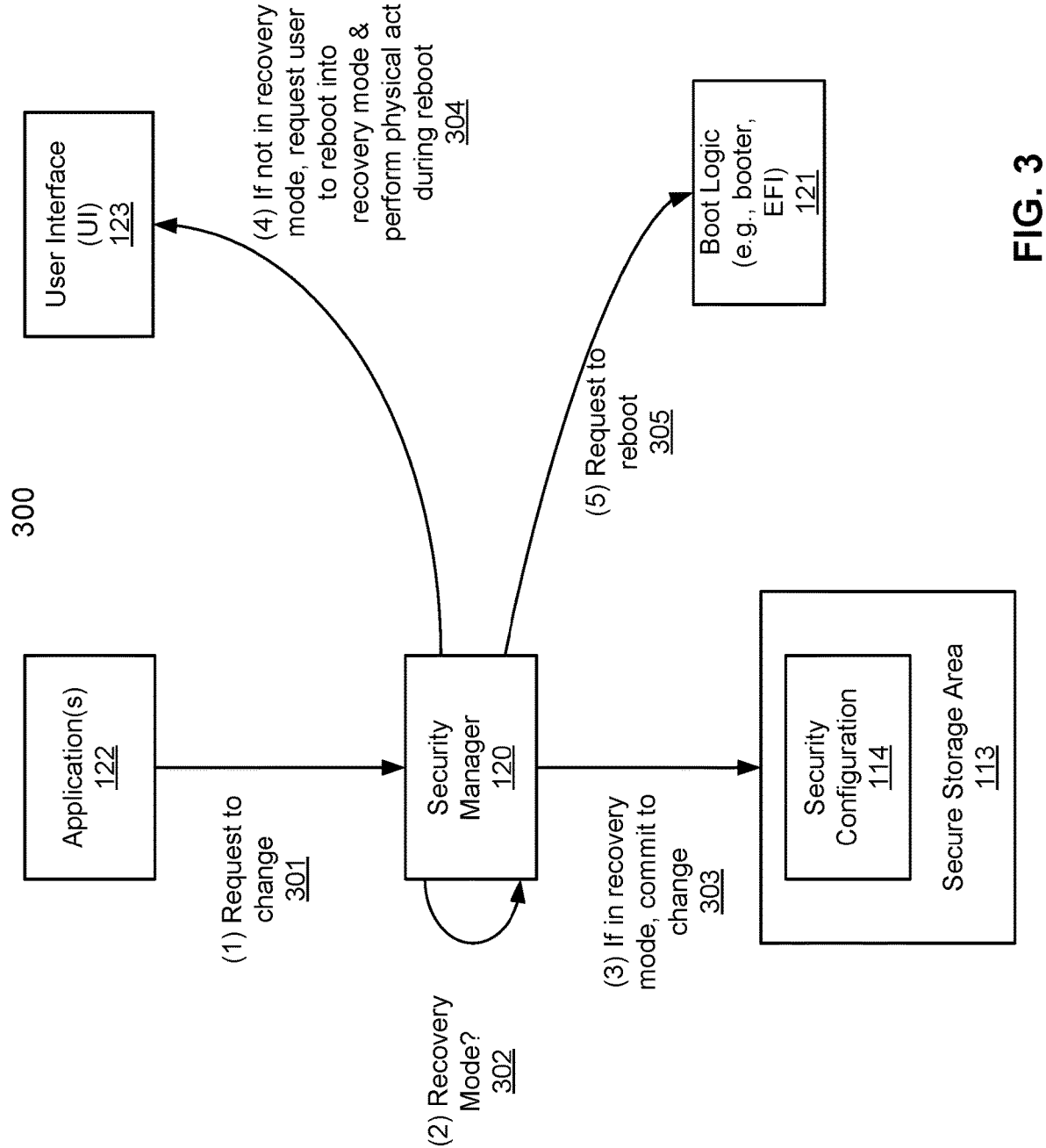
FIG. 3 is a transaction diagram illustrating a process of security configuration according to another embodiment of the invention.

FIG. 3 is a transaction diagram illustrating a process of security configuration according to another embodiment of the invention. System 300 may present system 100 of FIGS. 1A and 1B. Referring to FIG. 3, application 122 attempts to modify security configuration 114 by sending a request via path 301 to an operating system which is received by security manager 120. Application 122 may be a regular user application, a malware, or system configuration tool such as security configuration tool 118. In response to the request, security manager 120 determines whether the operating system is currently operating in a recovery mode via path 302. If it is determined that the operating system is operating in the recovery mode, security manager 120 commits the change to security configuration 114 via path 303. If it is determined that the operating system is not operating in the recovery mode, security manager 120 causes a message to be presented at user interface 123 via path 304. The message requests a user to reboot the system into a recovery mode and to physically perform a predetermined action. In response to a user confirmation of the reboot, security manager 120 sends a signal to boot logic to reboot the system via path 305.

Assuming that the system has been recovered into the recovery mode and the user has performed a predetermined physical action, the user can launch application 122 (e.g., security configuration tool 118) to request to change security configuration 114 again via path 301. In response, security manager 120 determines whether the operating system operates in the recovery mode via path 302. In this example, it is confirmed that the operating system indeed operates in the recovery mode. In response, security manager 120 commits the change to security configuration 114 via path 303.

Figure 4:
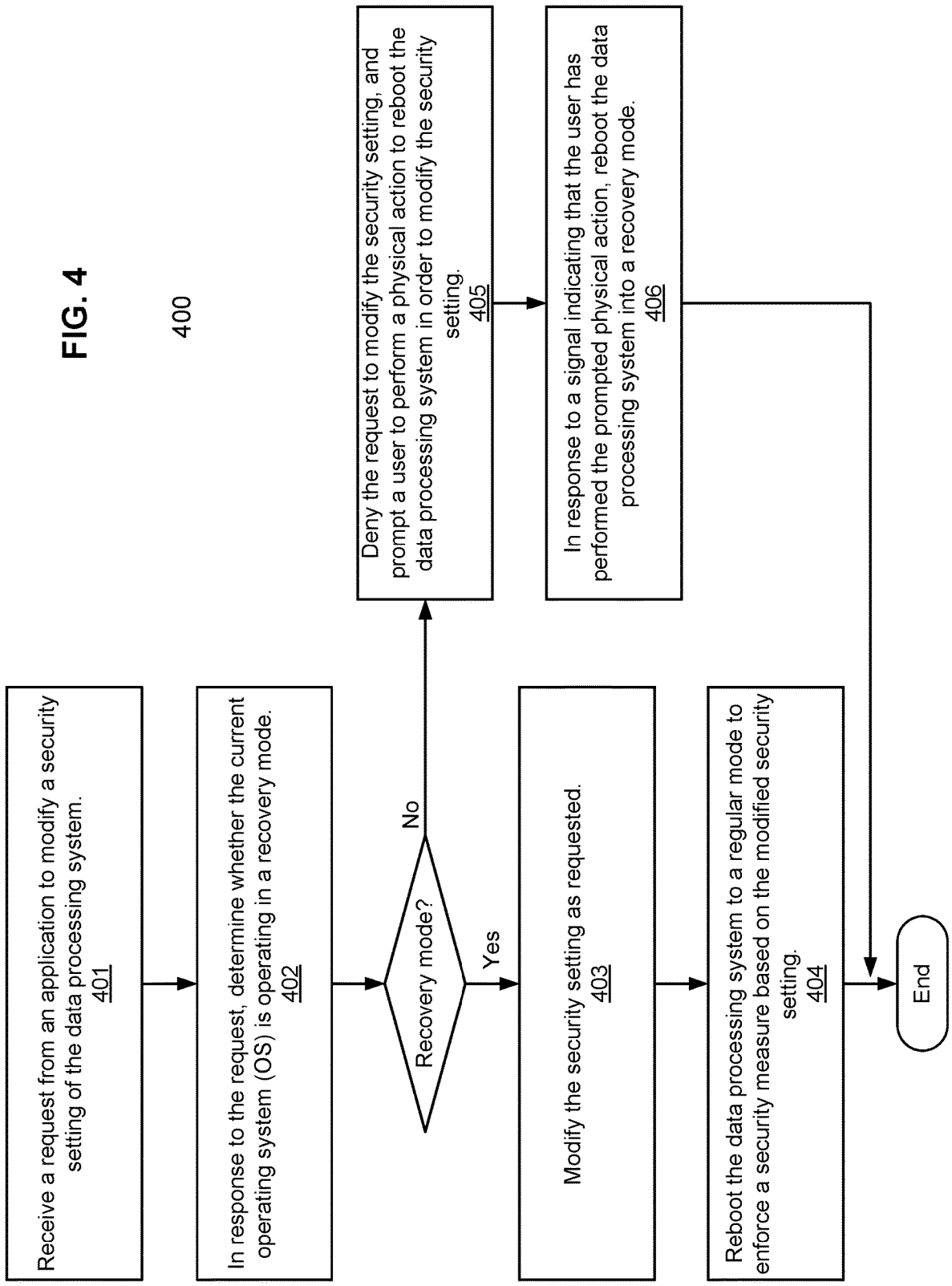
FIG. 4 is a flow diagram illustrating a process of security configuration according to another embodiment of the invention.

FIG. 4 is a flow diagram illustrating a process of security configuration according to one embodiment of the invention. Process 400 may be performed by processing logic that includes hardware (e.g. circuitry, dedicated logic, etc.), software (e.g., embodied on a non-transitory computer readable medium), or a combination thereof. For example, process 400 may be performed by system 300 of FIG. 3. Referring to FIG. 4, at block 401, processing logic receives a request from an application to modify a security settings of the data processing system. At block 402, processing logic determines whether the OS is currently operating in a recovery mode. If the OS is operating in a recovery mode, at block 403, processing logic modifies the security settings as requested. At block 404, the system is rebooted back into a regular mode to enforce a security measure based on the modified security settings. If the OS is operating in a regular mode determined at block 402, processing logic denies the request to modify the security settings at block 405. In addition, processing logic prompts a user to perform a physical act to reboot the system into a recovery mode in order to modify the security settings. In response to a signal indicating that the user has performed the prompted physical act, at block 406, processing logic reboots the system into a recovery mode.

Note that some or all of the components as shown and described above (e.g., security managers 120 and 130, boot logic 121, and/or security configuration tool 118 of FIGS. 1A-1B) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 5:
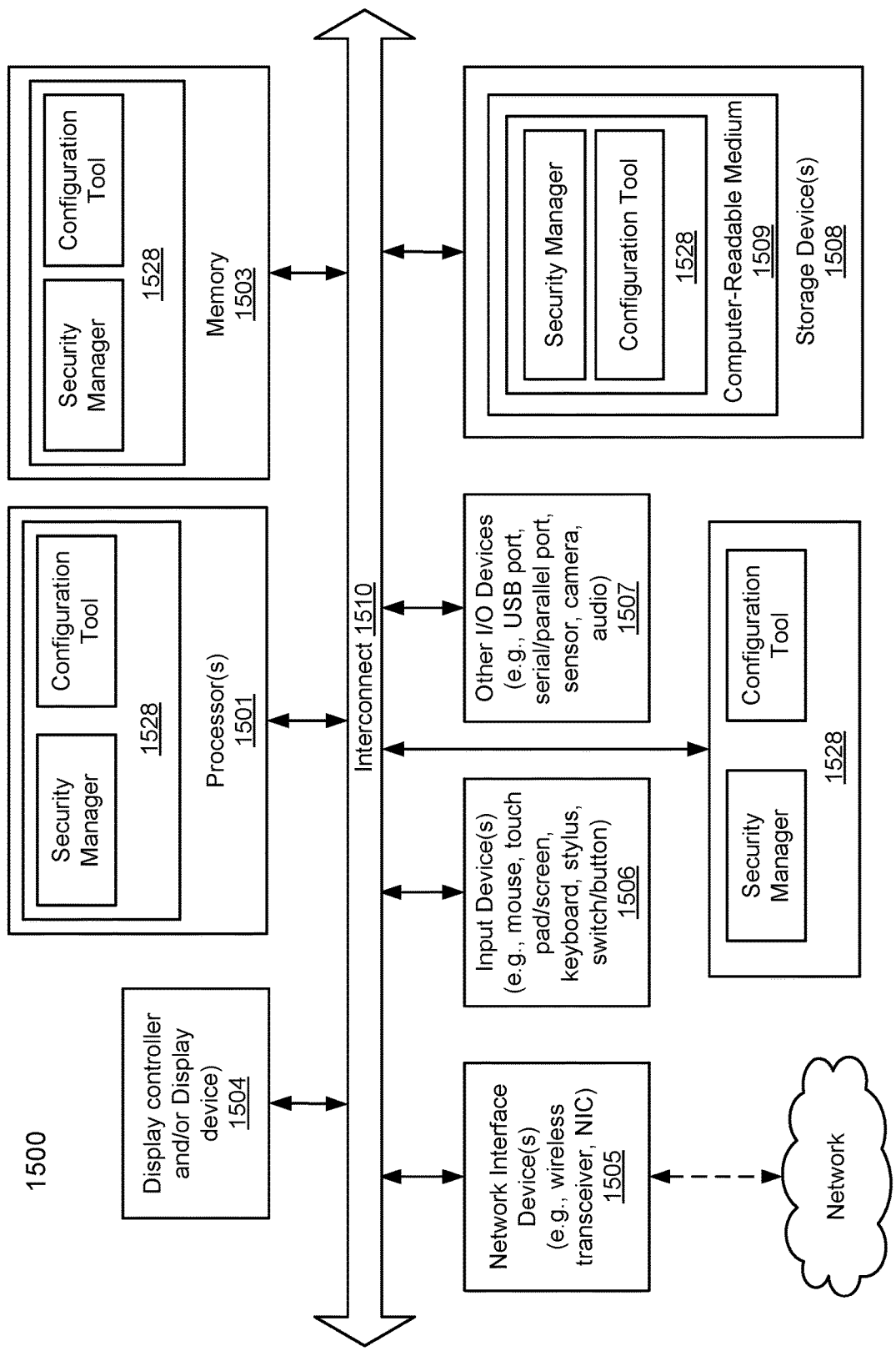
FIG. 5 is a block diagram illustrating a data processing system according to one embodiment.

FIG. 5 is a block diagram illustrating an example of a data processing system which may be used with one embodiment of the invention. For example, system 1500 may represents any of data processing systems described above performing any of the processes or methods described above, such as, for example, system 100 as shown in FIGS. 1A-1B. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop (e.g., iMac™ available from Apple Inc.® of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a Smartwatch (e.g., Apple Watch™), a personal communicator, a gaming device, a network router or hub, a wireless access point (AP) or repeater, a set-top box (e.g., Apple TV™ box), or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above, such as, for example, security manager and/or security configuration tool. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for configuring a security restriction of a data processing system, the method comprising:

receiving, by a security manager of a first operating system executed by a data processing system, a request received from an application to modify a security setting of the data processing system;

in response to the request, determining if the data processing system is in a recovery mode;

if the data processing system is in a recovery mode, modifying the security setting of the data processing system within the first operating system;

if the data processing system is not in a recovery mode and in response to receiving a signal indicating that a user has performed a previously requested physical action, rebooting the data processing system into a second operating system for the data processing system to operate in a recovery mode, wherein the second operating system includes functionalities that are fewer than the first operating system;

after the data processing system has been rebooted, modifying the security setting of the data processing system within the second operating system while the first operating system is not in operation;

after the security setting of the data processing system has been modified, rebooting the data processing system back to the first operating system; and enforcing a security measure within the first operating system based on the security setting that is modified within the second operating system.

2. The method of claim 1, further comprising:

prior to rebooting the data processing system, instructing a user to perform a predetermined physical action to an input device of the data processing system during the reboot of the data processing system; and during the reboot of the data processing system, detecting whether the user has performed the predetermined physical action, wherein the second operating system is launched in response to determining that the user has performed the predetermined physical action.

3. The method of claim 1, wherein the first operating system is launched from a first storage partition of a persistent storage device, and wherein the second operating system is launched from a second storage partition of the persistent storage device.

4. The method of claim 3, wherein the first operating system is a main operating system to allow a user to read and write files stored in a file system of the main operating system, and wherein the second operating system is a recovery operating system configured to restore or recover at least a portion of the main operating system.

5. The method of claim 3, wherein the second storage partition is a read-only storage partition.

6. The method of claim 1, further comprising storing the modified security setting in a secured storage area of the data processing system.

7. The method of claim 1, further comprising launching a security configuration tool within the second operating system after the reboot to allow a user to select and modify one or more of a plurality of security settings of the data processing system.

8. A non-transitory machine-readable medium having instructions stored therein, which when executed by one or more processors, cause the one or more processors to perform a method for configuring a security restriction of a data processing system, the method comprising:
receiving within a first operating system a request received from an application to modify a security setting of the data processing system;
in response to the request, determining if the data processing system is in a recovery mode;
if the data processing system is in a recovery mode, modifying the security setting of the data processing system within the first operating system;
if the data processing system is not in a recovery mode and in response to receiving a signal indicating that a user has performed a previously requested physical action, rebooting the data processing system into a second operating system for the data processing system to operate in a recovery mode, wherein the second operating system includes functionalities that are fewer than the first operating system;
after the data processing system has been rebooted, modifying the security setting of the data processing system within the second operating system while the first operating system is not in operation;
after the security setting of the data processing system has been modified, rebooting the data processing system back to the first operating system; and
enforcing a security measure within the first operating system based on the security setting that is modified within the second operating system.

9. The non-transitory machine-readable medium of claim 8, wherein the method further comprises:
prior to rebooting the data processing system, instructing a user to perform a predetermined physical action to an input device of the data processing system during the reboot of the data processing system; and
during the reboot of the data processing system, detecting whether the user has performed the predetermined physical action, wherein the second operating system is launched in response to determining that the user has performed the predetermined physical action.

10. The non-transitory machine-readable medium of claim 8, wherein the first operating system is launched from a first storage partition of a persistent storage device, and wherein the second operating system is launched from a second storage partition of the persistent storage device.

11. The non-transitory machine-readable medium of claim 10, wherein the first operating system is a main operating system to allow a user to read and write files stored in a file system of the main operating system, and wherein the second operating system is a recovery operating system configured to restore or recover at least a portion of the main operating system.

12. The non-transitory machine-readable medium of claim 10, wherein the second storage partition is a read-only storage partition.

13. The non-transitory machine-readable medium of claim 8, wherein the method further comprises storing the modified security setting in a secured storage area of the data processing system.

14. The non-transitory machine-readable medium of claim 8, wherein the method further comprises launching a security configuration tool within the second operating system after the reboot to allow a user to select and modify one or more of a plurality of security settings of the data processing system.

15. A data processing system, comprising:
one or more processors; and
a memory storing instructions, which when executed by the one or more processors, cause the one or more processors to perform operations, the operations including
receiving within a first operating system a request received from an application to modify a security setting of the data processing system,
in response to the request, determining if the data processing system is in a recovery mode,
if the data processing system is in a recovery mode, modifying the security setting of the data processing system within the first operating system,
if the data processing system is not in a recovery mode and in response to receiving a signal indicating that a user has performed a previously requested physical action, rebooting the data processing system into a second operating system for the data processing system to operate in a recovery mode, wherein the second operating system includes functionalities that are fewer than the first operating system,
after the data processing system has been rebooted, modifying the security setting of the data processing system within the second operating system while the first operating system is not in operation,
after the security setting of the data processing system has been modified, rebooting the data processing system back to the first operating system, and
enforcing a security measure within the first operating system based on the modified security setting that is modified within the second operating system.

16. The system of claim 15, wherein the operations further comprise:
prior to rebooting the data processing system, instructing a user to perform a predetermined physical action to an input device of the data processing system during the reboot of the data processing system; and
during the reboot of the data processing system, detecting whether the user has performed the predetermined physical action, wherein the second operating system is launched in response to determining that the user has performed the predetermined physical action.

17. The system of claim 15, wherein the first operating system is launched from a first storage partition of a persistent storage device, and wherein the second operating system is launched from a second storage partition of the persistent storage device.

18. The system of claim 17, wherein the first operating system is a main operating system to allow a user to read and write files stored in a file system of the main operating system, and wherein the second operating system is a recovery operating system configured to restore or recover at least a portion of the main operating system.

19. The system of claim 17, wherein the second storage partition is a read-only storage partition.

20. The system of claim 15, wherein the operations further comprise storing the modified security setting in a secured storage area of the data processing system.

21. The system of claim 15, wherein the operations further comprise launching a security configuration tool within the second operating system after the reboot to allow a user to select and modify one or more of a plurality of security settings of the data processing system.

\* \* \* \* \*